US011532831B1

(12) United States Patent
Beh (10) Patent No.: US 11,532,831 B1
(45) Date of Patent: Dec. 20, 2022

(54) REDOX-ACTIVE COMPOUNDS AND USES THEREOF (71) Applicant: Palo Alto Research Center Incorporated, Palo Alto, CA (US)

(72) Inventor: Eugene S. Beh, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/390,600

(22) Filed: Jul. 30, 2021

(51) Int. Cl.
*H01M 8/18* (2006.01)
*H01M 8/08* (2016.01)

(52) U.S. Cl.
CPC ............ *H01M 8/188* (2013.01); *H01M 8/08* (2013.01); *H01M 2300/0002* (2013.01)

(58) Field of Classification Search
CPC .................................................. H01M 8/188
See application file for complete search history.

(56) References Cited

U.S. PATENT DOCUMENTS

2020/0373599 A1* 11/2020 Gordon ................... B60L 50/16

FOREIGN PATENT DOCUMENTS

WO WO-2015044829 A1 * 4/2015 .......... H01M 10/052

OTHER PUBLICATIONS

17390600EICSEARCH (Year: 2022).*
Beh et al. "A Redox-Shuttled Electrochemical Method for Energy-Efficient Separation of Salt from Water", ACS Sustainable Chemistry & Engineering, 7 (15), 2019, pp. 13411-13417.
Beh et al., "A Neutral pH Aqueous Organic-Organometallic Redox Flow Battery with Extremely High Capacity Retention", ACS Energy Letters 2017 2 (3), 639-644.
Hurvois et al., "Reactivity of ferrocenium cations with molecular oxygen in polar organic solvents: Decomposition, redox reactions and stabilization", Journal of Organometallic Chemistry, vol. 690, Issue 7, Mar. 30, 2005, pp. 1829-1839.
Singh et al., "Kinetic Study of Ferrocenium Cation Decomposition Utilizing an Integrated Electrochemical Methodology Composed of Cyclic Voltammetry and Amperometry", The Analyst, Sep. 2014, 8 pages.

* cited by examiner

*Primary Examiner* — Brian R Ohara
(74) *Attorney, Agent, or Firm* — Mueting Raasch Group (57) ABSTRACT

Ferrocene based redox-active compounds have a total number of cyclopentadienyl substituents that is three or greater per ferrocene core. The cyclopentadienyl substituents generally have a linker and a solubilizing group. An aqueous solution of the redox-active compound and a salt may be used as an electrolyte. Aqueous compositions including the redox-active compounds may be used in electrodialysis systems.

19 Claims, 5 Drawing Sheets

REDOX-ACTIVE COMPOUNDS AND USES THEREOF

FIELD

The present disclosure generally relates to redox-active compounds, compositions containing the same, and methods of using the compounds.

BACKGROUND

Deployment of grid-scale electrical energy storage enables deep penetration of energy generation from intermittently available renewables. Today's batteries provide the capability for load shifting but high prices are still holding back widespread integration of storage, and consequently may slow the adoption of renewables. At the same time, rising water scarcity has forced the installation of energy-intensive desalination technologies to meet the growing water demand. For example, there is an ever-increasing pressure on supplies of fresh water as a result of climate change and the relentless pace of population growth worldwide. For communities located in areas where there is no ready access to fresh water, such as the Persian Gulf and other desert areas, fresh water is produced through desalination of seawater. This process is highly energy intensive whether it is driven hydraulically (e.g., through reverse osmosis (RO)), thermally (e.g., through flash distillation), or electrochemically (e.g., through electrodialysis). Elsewhere, all of these methods are routinely employed to treat contaminated wastewater from industrial activity.

In addition, the price of electricity generation from renewable sources is rapidly falling, driven primarily by technological improvements in solar and wind generation. For example, in October 2017, Saudi Arabia received a bid to provide electricity from solar power at a price of $17.90/MWh for a 300 MW plant. This ready availability of cheap electrons presents an opportunity for electrochemical methods of water desalination (or treatment) to play a greater role in meeting the rising demand for water.

SUMMARY

The disclosure describes a redox-active compound, compositions containing redox-active compounds, and methods of using the redox-active compounds.

In one aspect, this disclosure describes a redox-active compound according to Formula I. The redox-active compound has a ferrocene core and two cyclopentadienyl ligands associated with the ferrocene core. One or more —X—Y substituents is covalently bonded to each cyclopentadienyl ligand. Each X is independently a straight or branched alkyl of length $C_1$ to $C_{12}$. Each Y is a solubilizing group independently selected from oligo(ethyleneglycol), hydroxyl, trialkylammonio, alkylimidazolio, sulfonate, sulfate, carboxyl, phosphate, phosphonate, ammonium, or a nitrogen containing heterocycle. The total number of cyclopentadienyl ligand substitutions per ferrocene core is three or greater.

According to an embodiment, the solubilizing group is trialkylammonio or alkylimidazolio and the alkyl substituents on the solubilizing group are of $C_1$-$C_{12}$ in length.

According to an embodiment, the solubilizing group is trialkylammonio where at least one of the alkyl groups are methyl.

According to an embodiment, the total number of substituents bonded to the cyclopentadienyl ligands per ferrocene core is three, four, five, six, seven, eight, nine, or ten.

In another aspect, this disclosure describes an electrolyte composition. The composition includes a redox-active compound of Formula I and a salt.

According to an embodiment, the redox-active compound is present in the electrolyte composition at a concentration of 2 wt-% or greater, 3 wt-% or greater, 4 wt-% or greater, or 5 wt-% or greater, or up to 25 wt-%.

According to an embodiment, the salt of the electrolyte composition is LiCl, LiBr, $CaCl_2$, $MgCl_2$, or a combination thereof.

According to an embodiment, the salt of the electrolyte composition is present at a concentration of 1 wt-% or greater, 5 wt-% or greater, or 10 wt-% or greater, or up to 60 wt-%.

According to an embodiment, the electrolyte composition has a pH of 3 to 11 or from 5 to 9.

In another aspect, this disclosure describes a system. The system includes an apparatus that has a first reservoir with a first input and a first output, a second reservoir with a second output and a second input, a first electrolyte chamber that has a first electrode and first solution, and, a second electrolyte chamber that has a second electrode and a second solution. The first and second reservoirs are in electrolytic communication via a first type of membrane that is disposed between the first and second reservoirs. The first reservoir and the first chamber are in electrolytic communication via a second type of membrane that is disposed between the first chamber and the first reservoir. The second reservoir and the second chamber are in electrolytic communication via a second type of membrane that is disposed between the second reservoir and the second chamber. One, or both, of the first solution and the second solution contain a redox-active compound according to Formula I.

According to an embodiment, the solubilizing group of the redox-active compound in the system is trialkylammonio or alkylimidazolio where the alkyl substituents on the solubilizing group are of $C_1$ to $C_{12}$ in length.

According to an embodiment, the total number of substituents bonded to the cyclopentadienyl ligands is three, four, five, six, seven, eight, nine, or ten per ferrocene core.

BRIEF DESCRIPTION OF THE DRAWINGS

The discussion below makes reference to the following figures, wherein the same reference number may be used to identify the similar/same component in multiple figures. The drawings are not necessarily to scale.

DEFINITIONS

All scientific and technical terms have meanings commonly used in the art unless otherwise specified. The definitions provided are to facilitate understanding of certain terms used frequently and are not meant to limit the scope of the present disclosure.

The singular forms "a," "an," and "the" encompass embodiments having plural referents, unless the content clearly dictates otherwise.

The term "or" is generally employed in its sense including "and/or" unless the content clearly dictates otherwise. The term "and/or" means one or all of the listed elements or a combination of any two or more of the listed elements.

The terms "have," "having," "include," "including," "comprise," "comprising," or the like are used in their open-ended sense, and generally mean "including, but not limited to." It will be understood that "consisting essentially of," "consisting of" and the like are subsumed in "comprising" and the like.

The phrase "consisting essentially of" as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure, including the claims.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range. All upper and lower limits may be combined in any combination to form ranges for the particular component or property for example.

Use of "first," "second," etc. in the description above and the claims that follow is not intended to necessarily indicate that the enumerated number of steps are present. For example, a "second" step is merely intended to differentiate from another step (such as a "first" step). Use of "first," "second," etc. in the description above and the claims that follow is also not necessarily intended to indicate that one comes earlier in time than the other.

When a group is present more than once in a formula described herein, each group is "independently" selected, whether specifically stated or not. For example, when more than one $R^1$ group is present in a formula, each $R^1$ group is independently selected. Furthermore, subgroups contained within these groups are also independently selected.

The term "alkyl" refers to a monovalent group that is a radical of an alkane and includes straight-chain, branched, cyclic, and bicyclic alkyl groups, and combinations thereof, including both unsubstituted and substituted alkyl groups. The term "n-alkyl" (e.g., n-propyl) references to a monovalent group that is a radical of an alkane where the chain is linear.

The term "heterocyclic group" means a cyclic aliphatic group having at least one C atom replaced with a heteroatom such as N, O, or S.

The term "carbonyl" means a divalent group of formula —(CO)— where the carbon atoms is bonded to the oxygen with a double bond.

The term "quaternary nitrogen" refers to a tetravalent nitrogen atom bonded to four groups and that has a positive charge. The positively charged quaternary nitrogen group has associated with it a counter ion (anion).

A "phosphonate" group is an anion of formula —$PO_3^{2-}$ or —$PO_3H^-$ where the charge of the anion is balanced with a cation.

A "phosphate" group is an anion of the formula —$OPO_3H^{-1}$ or —$OPO_3^{2-}$ where the charge of the anion is balanced with a cation.

An "oligo(ethyleneglycol)", also referred to as polyethylene glycol, refers to a group of the formula —$[OCH_2CH_2]_n$— where n is the number of repeat units.

A "hydroxyl" refers to the formula —OH. At certain pH values the hydroxyl group may be deprotonated and have a negative charge.

A "trialkylammonio" refers to the formula —$NR_1R_2R_3$. Each R group may independently be selected from an alkyl of length $C_1$-$C_{12}$, unless otherwise specified.

A "alkylimidazolio" refers to formula where R is an alkyl group of length $C_1$-$C_{12}$, unless otherwise specified.

A "sulfonate" group is an anion of the formula —R—$SO_3$— where the charge of the anion may be balanced with a cation.

A "sulfate" group is an anion of the formula —R—$OSO_3$— where the charge of the anion may be balanced with a cation.

A "carboxyl" group is of the formula —COOH where at certain pH values the carboxyl may be deprotonated to possess a formal negative charge that may be balanced with a cation.

An "ammonium" group is a cation of the formula NR1R2R3R4 where each is independently H or an alkyl of length $C_1$-$C_{12}$, unless otherwise specified.

Ferrocene refers to $(\eta 5\text{-}Cp)_2Fe$ which can be represented by:

where two cyclopentadienyl ligands are associated with an iron atom. The iron atom is in the +2 oxidation state. The overall formal charge on the molecule is neutral. Ferrocenium is the cation form of ferrocene as described as ($\eta^5$-Cp)$_2$Fe$^+$. The iron atom of ferrocenium is in the +3 oxidation state.

The term "redox-active compound" refers to a compound that can be modulated to exist in different oxidation states. A redox-active compound may also be called a redox shuttle.

The term "electrolytic communication" refers to the ability of an ion, or a plurality of ions, to pass between two or more chambers or reservoirs, for example, passing through a membrane, to affect a chemical or electrochemical reaction.

DETAILED DESCRIPTION

The present disclosure is generally related to redox-active compounds. The redox-active compounds may be used in electrochemical desalination systems and optionally, corresponding, simultaneous energy storage. Research efforts in grid storage have been beholden to a singular approach—minimizing the cost per kWh, which has a Department of Energy cost target of $125/kWh by 2022. An alternative strategy is to increase the revenue associated with each kWh of storage, an alternative that is not available to conventional energy storage technologies. However, since the electrochemical batteries described in this disclosure produce a valuable secondary product, desalinated water, during charging and discharging, this alternative is possible. Because aqueous flow batteries share many capital requirements (e.g., pumps, membranes, plumbing) with electrochemical desalination technologies, a system that combines the two could lead to significant capital cost savings compared to two separate systems. Revenue from the desalinated water compensates for additional capital costs and leverages process intensification to break below the $/kWh barrier encountered by traditional energy storage technologies. Electrochemical approaches to desalination have the potential to scale modularly and ramp production easily, while maintaining high energetic efficiency and the ability to process high-salinity feeds.

The state of the art in electrochemical water desalination is electrodialysis; however, it consumes comparatively more energy for salt removal (e.g., ~0.26-0.30 kWh/kg NaCl) than other desalination techniques like reverse osmosis (e.g., 0.06-0.08 kWh/kg NaCl) but less than for thermal techniques like vapor compression (e.g., 0.6-1.0 kWh/kg NaCl). Capacitive deionization uses electrical energy but is also energy intensive at about 0.22 kWh/kg NaCl and is best suited for removing minute amounts of dissolved salts from water because the electrodes have to be solid, by definition. While electrodialysis is a technique that can be employed to treat brines at any salinity, unlike reverse osmosis, it has seen limited use because of its high specific energy consumption for salt removal.

Because the energy consumption in electrodialysis is proportional to the applied voltage, reducing (or minimizing) the voltage that will be applied to a cell will reduce the specific energy consumption of the electrodialysis stack. In conventional electrodialysis, ions are driven out of, or into, seawater by Faradaic reactions at an anode and cathode. In most cases, the Faradaic reactions are simply that of water splitting: water is oxidized to oxygen at the anode and reduced to hydrogen at the cathode. This creates a charge imbalance at the electrodes that is balanced by the movement of ions through strategically placed ion-selective membranes. However, water splitting involves an energetic penalty because energy is needed to do so. The problem is exacerbated by the fact that significant overpotentials are associated with both water oxidation and reduction. Moreover, oxygen and chlorine gas generated at the anode are highly destructive and make use of platinum/iridium-plated electrodes.

In the state of California alone, if all in-state fossil fuel sources of electrical generation (0.40 quads, 41% of all sources) were to be replaced by solar and paired with the desalination battery for storage as described herein, it would enable an additional 0.63 quads of solar generation to be brought online, based on a cost-optimized round-trip energy efficiency of 64%. At the same time, the desalination battery would provide a water resource that is equivalent to 30% of state consumption.

The redox-active compounds in the present disclosure may be used in an electrochemical cell that is designed to perform electrodialysis in an energy-efficient manner by circulating a redox-active compound that is dissolved in water from the anode to the cathode and back again. The redox-active compound has rapid kinetics for reduction or oxidation, which greatly reduces the high operating voltage needed for conventional electrodialysis, in which water splitting drives salt transport across membranes such as ion-selective membranes. Reducing the operating voltage reduces the specific consumption of energy because the specific energy consumption is proportional to the operating voltage. The system may furthermore be reversibly adapted for coupled electrical energy storage, by pairing two different redox-active compounds at the anode and cathode. For example, two different redox-active compounds described in the present disclosure may be paired where each redox-active compound is separately located at the anode or the cathode. Additionally, a redox-active compound described in the present disclosure may be paired with a redox-active compound previously available in the art where the redox-active compounds are separately located at the anode and the cathode.

In certain embodiments of an energy-efficient, low-potential electrodialysis system, a redox-active compound, also termed a redox carrier or redox shuttle, that is dissolved in water is reduced at the cathode, then shuttled to the anode where it is re-oxidized and subsequently redelivered to the cathode to complete the cycle.

Energy efficiency of an electrodialysis system is achieved through the selection of the redox-active compound. An effective redox-active compound possesses as many of the following properties as possible. For example, the redox-active compound should be chemically stable in oxidized and reduced forms, remain highly water-soluble in oxidized and reduced forms, and not be oxygen sensitive in oxidized and reduced forms. The redox-active compound should not be proton coupled, should possess rapid redox kinetics, and should be chemically compatible with any component present in the water being treated. The redox-active compound should be stable and functionable at the pH of the water being treated. Further, the redox-active compound should have low permeability through ion-selective membranes and be nontoxic.

The redox-active compounds of the present disclosure are chemically stable in oxidized and reduced forms, remain highly water-soluble in oxidized and reduced forms, and are not oxygen sensitive in oxidized and reduced forms. The redox-active compounds of the present disclosures are not proton coupled, possess rapid redox kinetics, and are chemically compatible with any component present in the water being treated. The redox-active compounds of the present disclosures are stable and functionable at the pH of the water being treated. The redox-active compounds of the present disclosure have low permeability through ion-selective membranes and are nontoxic.

The most popular redox-active compounds that have been reported to date are iron-containing compounds, including iron(II) ($Fe^{2+}$)/iron(III) ($Fe^{3+}$), the ferrocyanide/ferricyanide (Fe(CN)) couple, and ethylenediaminetetraacetatoferrate(2-) (Fe(II)-EDTA)/ethylenediaminetetraacetatoferrate(1-) (Fe(III)-EDTA). All three have been considered for use in reverse electrodialysis, i.e., the generation of electricity from salinity gradients instead of the consumption of electricity to create a salinity gradient. Unfortunately, $Fe^{3+}$ ions are only soluble at low pH and form insoluble oxides or hydroxides at neutral pH, Fe(CN) forms highly insoluble Prussian Blue-type compounds upon contact with many transition metals (especially iron), and Fe-EDTA complexes show limited electrochemical stability.

While a system with Fe(CN) as the redox-active compound may be successfully demonstrated in the laboratory with only NaCl as simulated seawater, the ubiquitous presence of calcium and iron in seawater (typically at levels of 400 parts per million (ppm) and 1-3 parts per billion (ppb), respectively) will quickly cause membrane fouling when these ions cross over into the reservoirs. There, they form insoluble precipitates of potassium, calcium, and iron upon contact with Fe(CN). Furthermore, even neutral to slightly acidic conditions, which are created at the anode, will cause the release of highly toxic hydrogen cyanide.

However, ferrocene derivatives provide an alternative to previously available iron redox-active compounds. Ferrocene has an iron core with two cyclopentadienyl ligands. The cyclopentadienyl ligands may be substituted with various chemical moieties. Each cyclopentadienyl substituents of the redox-active compound generally has a linker and a solubilizing group. The linker connects the solubilizing group to the cyclopentadienyl ligand. The linker may be an alkyl group.

An example of a redox-active ferrocene derivative useful as a redox-active compound is bis(trimethylammoniopropyl)ferrocene (BTMAP-Fc) of the structure:

BTMAP-Fc possesses all of the attributes listed above may be a suitable redox-active compound. The properties of BTMAP-Fc compared with various iron-containing redox-active couples in Table 1 below.

TABLE 1

|  | $Fe^{2+}/Fe^{3+}$ | Fe(EDTA) | Fe(CN) | BTMAP-Fc |
|---|---|---|---|---|
| Chemical and electrochemical stability | Excellent | Poor | Excellent (but ferricyanide is light sensitive) | Excellent |
| Solubility at pH 7 | $Fe^{3+}$ is insoluble | 0.4M | 0.6M | 1.9M |
| Kinetic rate constant on glassy carbon | $1.2 \times 10^4$ cm/s | $2.6 \times 10^{-2}$ cm/s† | $\sim 1 \times 10^{-1}$ cm/s | $1.4 \times 10^{-2}$ cm/s |
| Forms insoluble precipitates with other ions | No | No | Yes | No |

TABLE 1-continued

|  | $Fe^{2+}/Fe^{3+}$ | Fe(EDTA) | Fe(CN) | BTMAP-Fc |
|---|---|---|---|---|
| Permeability | Unknown | Unknown | $<1 \times 10^{-11}$ cm²/s (Nafion 212)‡ | $6.2 \times 10^{-10}$ cm²/s (Selemion DSV) |
| Toxicity | Low | Low | Generally low, but releases HCN at pH ≤ 7 | Expected to be low |

†On platinum
‡At pH 14

Notably, each of the redox couples, other than BTMAP-Fc, has at least one property that is inconsistent with the properties of an effective redox-active compound for the above-discussed cell. For example, $Fe^{2+}/Fe^{3+}$ is insoluble at pH 7, Fe(EDTA) has poor chemical and electrochemical stability, and Fe(CN) forms insoluble precipitates with other ions and releases toxic HCN at a pH of 7 or less. In principle, any water-soluble redox-active compound could be used in embodiments of the cell of FIGS. 1A-1B, not just those listed in Table 1. For example, depending on the desired pH of the desalinate and salinate streams, other redox couples may be preferred. An example of such an energy-efficient redox assisted electrodialysis system is described further below.

Ferrocene derivatives with an increased number of charged, bulky substituents may have improved chemical stability over ferrocene derivatives that have a single substituent on each cyclopentadienyl ring. Ferrocene derivatives with an increased number of charged, bulky substituents may have improved electrochemical stability over ferrocene derivatives that have a single substituent on each cyclopentadienyl ring. Ferrocene derivatives with an increased number of charged, bulky substituents may have improved water solubility over ferrocene derivatives that have a single substituent on each cyclopentadienyl ring. Ferrocene derivatives with an increased number of charged, bulky substituents may have improved water solubility at a wider range of pH levels. Ferrocene derivatives with an increased number of charged, bulky substituents may have improved stability at a wider range of pH levels.

Figure 3:
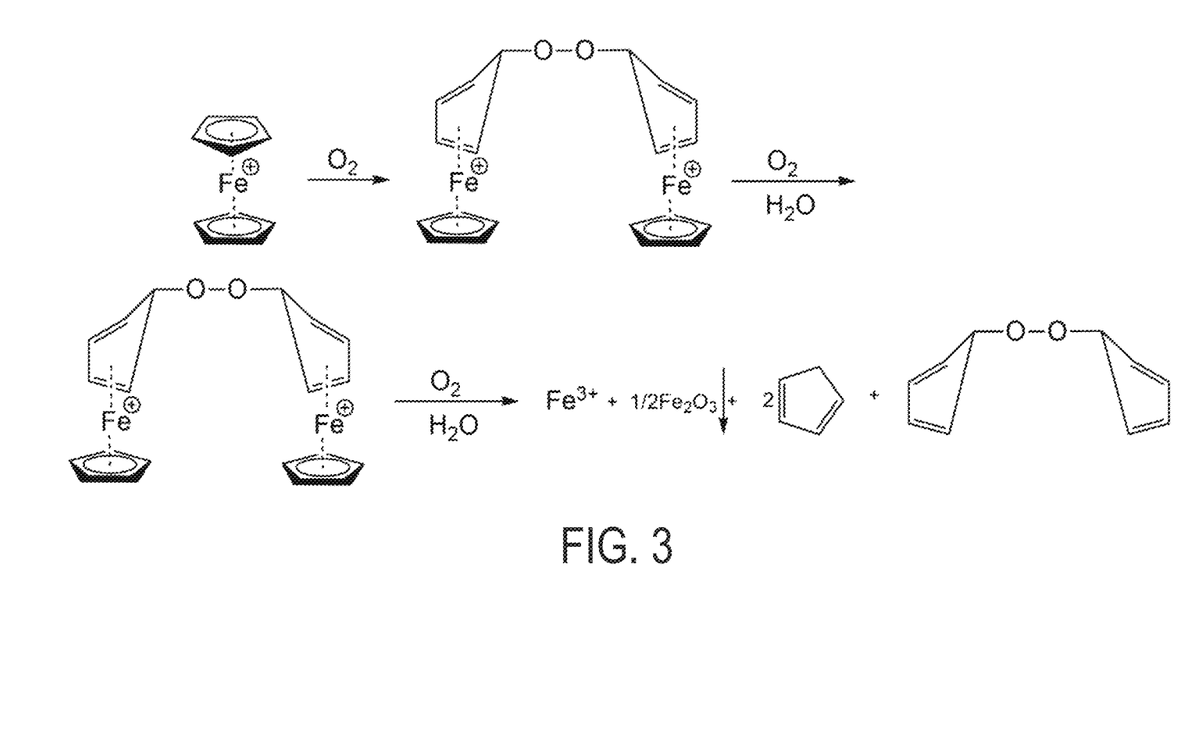
FIG. 3 is the proposed reaction scheme for the decomposition of ferrocene.

Quaternary nitrogen linkers dramatically improve the oxygen stability of ferrocene, especially in its oxidized (ferrocenium) state. Quaternary nitrogen linkers also dramatically improve the water stability of ferrocene, especially in its oxidized (ferrocenium) state. The mechanism of decomposition in unsubstituted ferrocene has been attributed to a bimolecular, second-order reaction between two ferrocenium ions (FIG. 3, reproduced from Singh, et al., A Kinetic Study of Ferrocenium Cation Decomposition Utilizing an Integrated Electrochemical Methodology Composed of Cyclic Voltammetry and Amperometry, 139 Analyst 5747 (2014)). Increasing the number of substituents on the cyclopentadienyl ligands on ferrocene is also associated with improved stability. In addition, charged quaternary nitrogen alkyl substituents on the ferrocene centers provide increased steric and Coulombic repulsion between different ferrocenium ions, thereby greatly improving stability.

The redox-active compounds of the present disclosure includes a ferrocene core and two cyclopentadienyl ligands. A total of three or more independently selected-X—Y substituents are covalently bonded to the cyclopentadienyl ligands. Each X is independently selected from a linear or branched alkyl. Each X is covalently bonded to one of the cyclopentadienyl ligands and one Y group. Each Y is a solubilizing group independently selected from oligo(ethyleneglycol), hydroxyl, trialkylammonio, alkylimidazolio, sulfonate, sulfate, carboxyl, phosphate, phosphonate, ammonium, or a nitrogen containing heterocycle.

The disclosed redox-active compounds may also be represented by the general formula I:

In Formula I, a first cyclopentadienyl ligand and a second cyclopentadienyl ligand are associated with the iron core. The first cyclopentadienyl ligand may have $n_1$ total number of independently selected —X—Y substituents. The second cyclopentadienyl ligand has a total of $n_2$ independently selected —X—Y substituents.

The compounds of the general Formula I may be ferrocene-based with a neutral charge (ferrocene) or be a ferrocenium cation. The iron core may have the oxidation state of $Fe^{+2}$ or $Fe^{+3}$.

The first cyclopentadienyl ligand and the second cyclopentadienyl ligands are interchangeable. The first cyclopentadienyl ligand and second cyclopentadienyl ligand and are distinguished here to enhance the understanding of the number of —X—Y substituents on each cyclopentadienyl ligand ($n_1$ and $n_2$). For example, the first cyclopentadienyl ligand has $n_1$ —X—Y substituents and the second cyclopentadienyl ligand has $n_2$ —X—Y substituents.

The total number of —X—Y cyclopentadienyl substitutes on the first cyclopentadienyl and the second cyclopentadienyl ligands $n_1+n_2$ is 3 or greater.

In some embodiments, the number $n_1$ of —X—Y substituents on the first cyclopentadienyl ligand and the number $n_2$ of —X—Y substituents on the second cyclopentadienyl ligand are the same. In some embodiments $n_1$ is 2 and $n_2$ is 2. In some embodiments $n_1$ is 3 and $n_2$ is 3. In some embodiments $n_1$ is 4 and $n_2$ is 4. In some embodiments $n_1$ is 5 and $n_2$ is 5.

In some embodiments, the number $n_1$ of —X—Y substituents on the first cyclopentadienyl ligand and the number $n_2$ of —X—Y substituents on the second cyclopentadienyl ligand are different. In some embodiments $n_1$ is 1 and $n_2$ is 2. In some embodiments $n_1$ is 1 and $n_2$ is 3. In some embodiments $n_1$ is 1 and $n_2$ is 4. In some embodiments $n_1$ is 1 and $n_2$ is 5. In some embodiments $n_1$ is 2 and $n_2$ is 3. In some embodiments $n_1$ is 2 and $n_2$ is 4. In some embodiments $n_1$ is 2 and $n_2$ is 5. In some embodiments $n_1$ is 3 and $n_2$ is 4. In some embodiments $n_1$ is 3 and $n_2$ is 5. In some embodiments $n_1$ is 4 and $n_2$ is 5.

Figure 4:
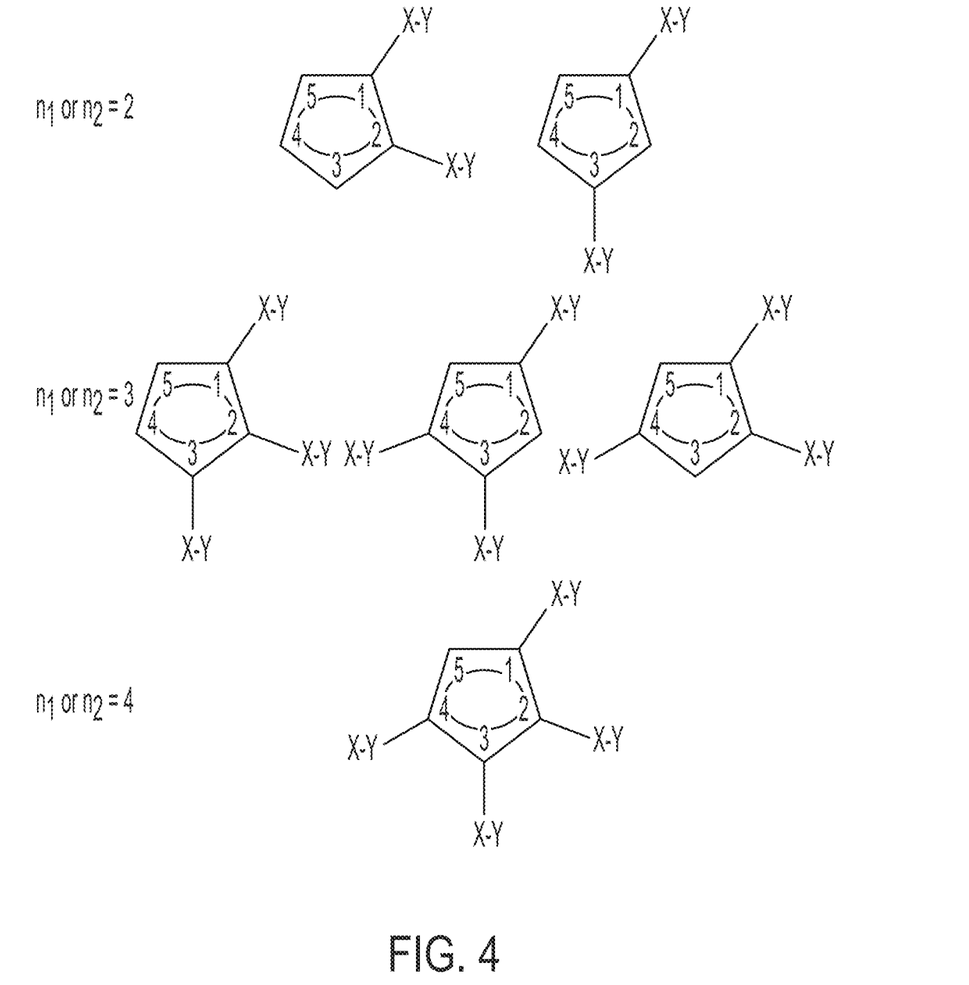
FIG. 4 are the possible substitution patterns of a multiply substituted cyclopentadienyl ligand.

Any substitution pattern of the —X—Y substituents around a multiply substituted cyclopentadienyl ring (where $n_1$ or $n_2$ is 1 or greater) are allowed as shown in FIG. 4. In some embodiments where $n_1$ is 2, the —X—Y substitution pattern around the cyclopentadienyl ring may be 1,2 or 1,3. In some embodiments where $n_1$ is 3, the —X—Y substitution pattern around the cyclopentadienyl ring may be 1,2,3 or 1,2,4. In some embodiments where $n_1$ is 4, the —X—Y substitution pattern around the cyclopentadienyl ring may be 1,2,3,4. In some embodiments the substitution pattern of the —X—Y substituents $n_1$ and $n_2$ are the same. In some embodiments the substitution pattern of the —X—Y substituents $n_1$ and $n_2$ are different.

Of the cyclopentadienyl substituent —X—Y, X is generally a linker, such as an alkyl group, and Y is a solubilizing group.

In formula I, each X is independently a branched or linear alkyl.

In some embodiments, each X may independently be a linear alkyl from $C_1$ to $C_{12}$ in length. In some embodiments, each X is independently a linear alkyl from $C_1$ to $C_3$, $C_1$ to $C_6$, or $C_1$ to $C_9$ in length. In some embodiments each X is independently a linear alkyl from $C_2$ to $C_6$ in length. In some embodiments, each X is independently a linear alkyl selected from n-methyl, n-ethyl, n-propyl, n-butyl, n-pentyl, n-hexyl, n-heptyl, n-octyl, n-nonyl, n-decyl, n-undecyl, or n-dodecyl. In some embodiments X is n-propyl.

In Formula I, each X may independently be a branched alkyl. A branched alkyl has a central alkyl chain and one or more branches covalently bonded to the central alkyl chain. In some embodiments, the central alkyl chain may independently be a linear alkyl from $C_1$ to $C_{12}$. In some embodiments, the central alkyl chain of a branched alkyl is from $C_1$ to $C_3$, $C_1$ to $C_6$, or $C_1$ to $C_9$ in length. In some embodiments the central alkyl chain of a branched alkyl is from $C_2$ to $C_6$ in length. In some embodiments, the central alkyl chain of a branched alkyl is propyl. In some embodiments, each X may independently be a singly branched central alkyl chain. Examples of a singly branched alkyl include but are not limited to (1-methyl)ethyl, (3-ethyl)propyl, (3-butyl)pentyl, (4-pentyl)hexyl, (3-hexyl)heptyl, (5-heptyl)octyl, (3-octyl)nonyl, (6-nonyl)decyl, (2-decyl)undecyl, and (5-undecyl)dodecyl. In some embodiments, the central alkyl chain may be multiply branched where the total number of branches possible is $C_{n-1}$ where n is the total number of carbons in the central alkyl chain. For example, if $n_1$ is 5 then the total number of branches possible is 4. Examples of a multiply branched alkyls include but are not limited to (1,2-dimethyl)ethyl, (1,2,3,4-tetramethyl)octyl, and (3,6,9-triethyl)dodecyl. In some embodiments, the alkyl branches of the multiply branched alkyl central chain may be the same length. In some embodiments, the alkyl branches of the multiply branched alkyl central chain are different lengths. Examples of a multiply branched alkyl central chain where the branch alkyl are of different lengths include but are not limited to (2-methy-4-butyl)octyl, (1-methy-5-hexyl)dodecyl, and (2-methyl-butyl)hexyl.

In Formula I, each Y is independently a solubilizing group. In some embodiments, each Y is a solubilizing group independently selected from trialkylammonio, dialkylimidazolio, ammonium, oligo(ethyleneglycol), hydroxyl, phosphonate, carboxyl, nitrogen containing heterocycle, sulfonate, sulfate, or phosphate.

In some embodiments Y is a trialkylammonio or the dialkylimidazolio. The trialkylammonio or dialkylimidazolio may be of length $C_1$-$C_{12}$. Examples of trialkylammonio or dialkylimidazolio alkyl groups include n-methyl, n-ethyl, n-propyl, n-butyl, n-pentyl, n-hexyl, n-heptyl, n-octyl, n-nonyl, n-decyl, n-undecyl, and n-dodecyl. Each alkyl group of the trialkylammonio or the dialkylimidazolio may be the same or different. In some embodiments, two of the alkyl groups of the trialkylammonio are the same. In some embodiments, one of the alkyl groups of the trialkylammonio is methyl and the two other alkyl groups are independently selected from an alkyl group of length $C_1$-$C_{12}$. In some embodiments, two of the alkyl groups of the trialkylammonio are methyl and the third alkyl group is of length $C_1$-$C_{12}$. In some embodiments, three of the alkyl groups of the trialkylammonio are methyl.

In some embodiments Y is a nitrogen containing heterocycle. The nitrogen containing heterocycle may be fully unsaturated, partially unsaturated, or fully saturated. The nitrogen containing heterocycle may have a formal charge. Examples of nitrogen containing heterocycles that have a formal charge include but are not limited to aziridinium, azetidinium, pyrrolidinium, piperidinium, azepanium, pyrrolium, and pyridinium. In some embodiments, the nitrogen containing heterocycles may contain more than one nitrogen. Examples include but are not limited to imidazolium, pyrimidinium, and pyrazinium, tetrazolium, and triazolium. In some embodiments, the nitrogen containing unsaturated or saturated heterocycles may contain other heteroatoms such as O and S. Examples include but are not limited to thiazolium, isoxazolium, and oxazolium. In some embodiments, the nitrogen containing heterocycles may be a fused ring system. Examples include but are not limited to indolium, quinolinium, isoquinolinium.

In some embodiments Y is oligo(ethyleneglycol) (OEG). The oligo(ethyleneglycol) may have from 1-20 OEG repeat units. In some embodiments, the oligo(ethyleneglycol) may have from 1-5 OEG repeat units. In some embodiments, the oligo(ethyleneglycol) may have from 1-10 OEG repeat units. In some embodiments, the oligo(ethyleneglycol) may have from 1-15 OEG repeat units. In some embodiments, the oligo(ethyleneglycol) may have from 5-10 OEG repeat units. In some embodiments, the oligo(ethyleneglycol) may have from 10-15 OEG repeat units. In some embodiments, the oligo(ethyleneglycol) may have from 15-20 OEG repeat units.

The redox-active compounds of formula I may include a counterion or a plurality of counterions. Examples of counterions include but are not limited to $Cl^-$, $Br^-$, $I^-$, $Li^+$, $Ca^+$, $Mg^{2+}$, $BF_4^-$ and $Na^+$.

Figure 1A:
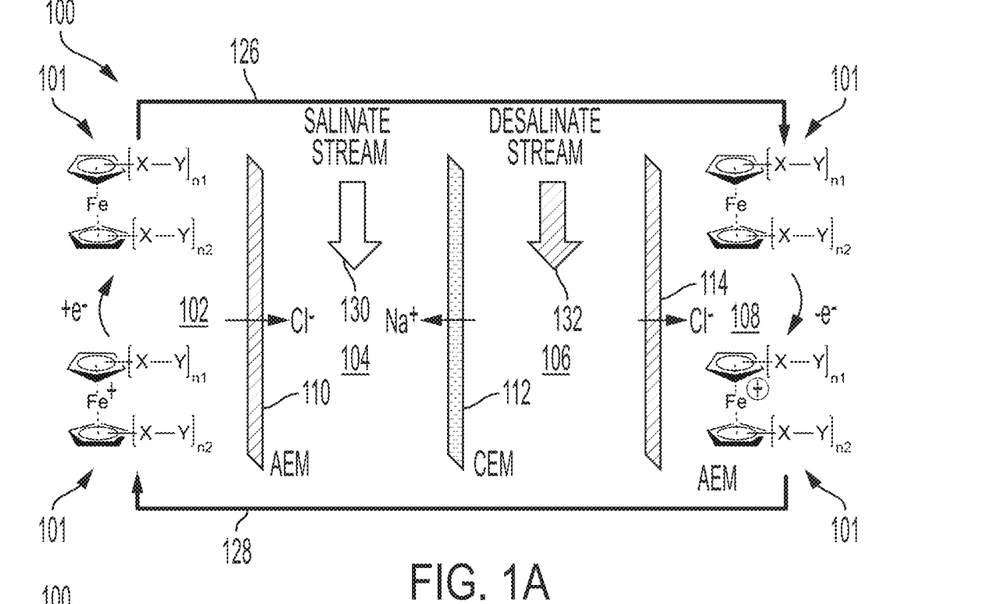
FIG. 1A is a schematic diagram of an electrodialysis system with a positively charged redox shuttle in accordance with certain embodiments.
Figure 1B:
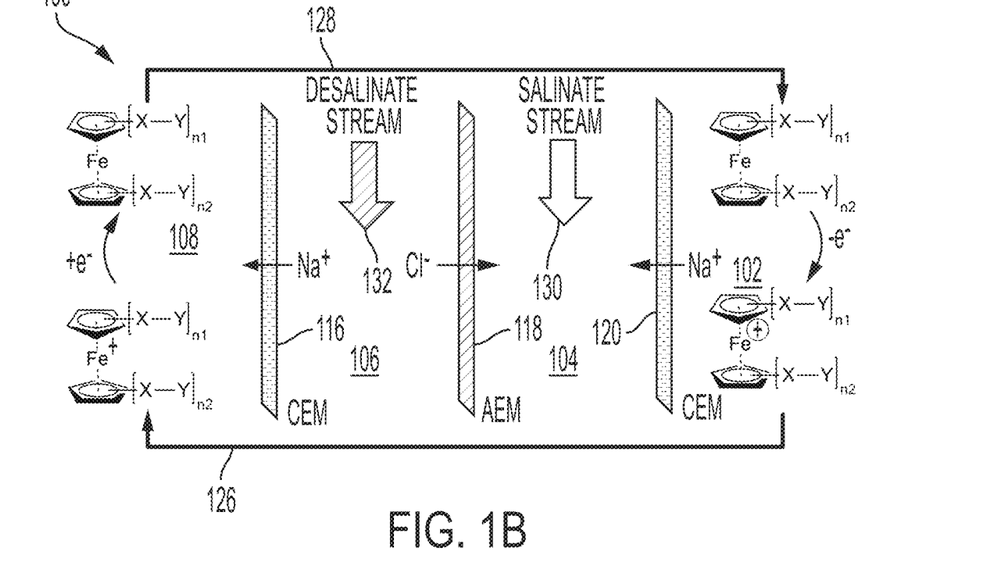
FIG. 1B is a schematic diagram of an electrodialysis system with a negatively charged redox shuttle in accordance with certain embodiments.

According to an embodiment the redox-active compounds of Formula I may be used in electrodialysis systems such as describe in FIG. 1A-1B. An electrochemical cell 100 providing energy-efficient electrodialysis, according to such embodiments, is shown. The cell 100 has of four chambers 102, 104, 106, 108 in series. Each chamber is separated from its neighbor by an appropriate membrane 110, 112, 114 (FIG. 1A) or 116, 118, 120 (FIG. 1). The two central chambers 104, 106 contain a salinate stream 130 and a desalinate stream 132, and the two outer chambers 102, 108 respectively contain the cathode and the anode (FIG. 1A) or the anode and the cathode (FIG. 1). Chambers 102 and 108 may contain electrolytes. For example, the chamber containing the cathode may also contain a catholyte and the chamber containing the anode may also contain an anolyte. The redox-active compounds of Formula I, and other previously available redox-active compounds, may be a part of the composition of anolyte or catholyte. For example, the redox-active compounds of Formula I, may be in chamber 102 as a part of the catholyte composition or chamber 108 as a part of the anolyte composition. In some embodiments, the redox-active compound of Formula I is only a part of the anolyte or catholyte composition. In some embodiments, the redox-active compounds of Formula I are both apart of the anolyte and catholyte compositions. The membranes may be ion-selective membranes such as cation exchange membranes or anion exchange membranes depending upon the cell design. If the redox-active compounds have a high enough molecular weight (e.g., are dendrimeric or polymeric in nature), the membranes may be microporous membranes. The membranes may also incorporate some ion-selective elements and some microporous elements within the same membrane. In certain embodiments, the membranes may also be composite membranes.

For example, FIG. 1A illustrates a redox-assisted electrodialysis system with a positively charged redox-active compound 101. Movement of the redox-active compound from the anode 108 to the cathode 102 is shown by arrow 128 and from the cathode 102 to the anode 108 by arrow 126. The cathode chamber 102 and the salinate chamber 104 are separated by an anion exchange membrane 110, and the anode chamber 108 and the desalinate chamber 106 are also separated by an anion exchange membrane 114. However, membranes 110 and 114 may not necessarily comprise the same material or be of similar dimensions. The salinate chamber 104 is also separated from the desalinate chamber 106 by a cation exchange membrane 112. As can be seen, chloride and sodium ions cross membranes 110 and 112 to enter the salinate stream 130 in chamber 104 while they cross membranes 114 and 112 to leave the desalinate stream 132 in chamber 106.

In various embodiments, an arbitrary number of pairs of alternating salinate and desalinate chambers may be employed. However, water splitting may start to occur at a high number of chambers once the applied voltage exceeds 1.26 V.

According to an embodiment, the redox-active compounds of Formula I can be used in energy storage devices. For example, the four-chambered cell design discussed above in connection with FIGS. 1A-B may also be adapted for use as an energy storage device (i.e., an electrodialytic battery). When the cell uses a small number of salinate/desalinate chamber pairs (e.g., one pair), the performance is improved over traditional electrodialysis. A fewer number of chamber pairs is also advantageous for energy storage applications where preferred operating current density is also lower than that for electrodialysis. The above-described cell is adapted for energy storage by using two different redox-active compounds as separate anolytes and catholytes instead of shuttling the same redox-active compound between the anode and cathode.

In some embodiments, two different redox-active compounds of the Formula I may be used. In some embodiments, a redox-active compound of Formula I and a previously available redox-active compound may be used. Unlike three-chambered cell designs (e.g., U.S. Pat. Nos. 9,340,436; 9,670,077; and 9,673,472, each of which is incorporated herein by reference), a four-chambered design is capable of continuous production of desalinated water at all times during operation—instead of only half of the time. Also, the four-chambered design does not suffer from precipitation of insoluble solids if crossover takes place.

Figure 2A:
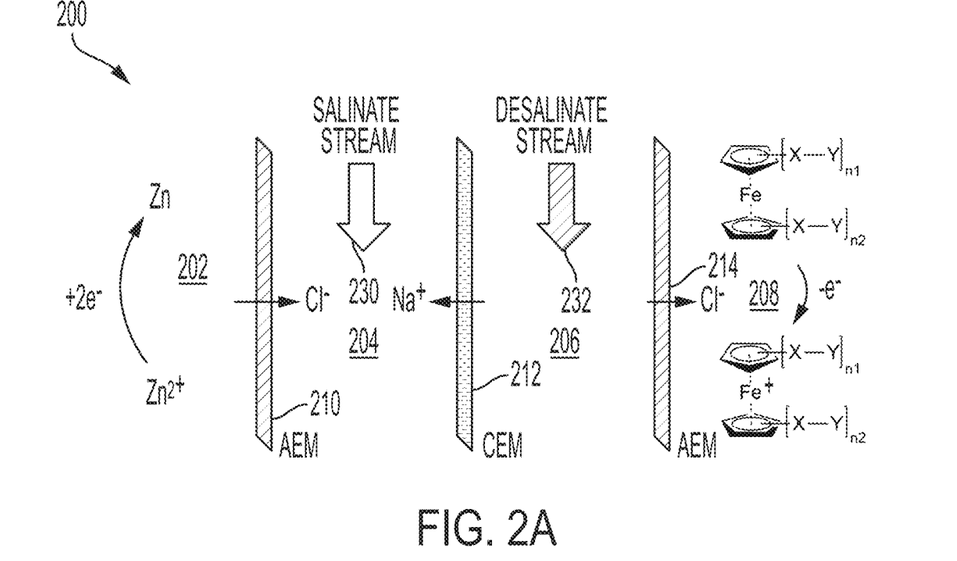
FIG. 2A is a schematic diagram of a charge cycle of an electrodialytic battery with a pair of positively charged reactants in accordance with certain embodiments.
Figure 2B:
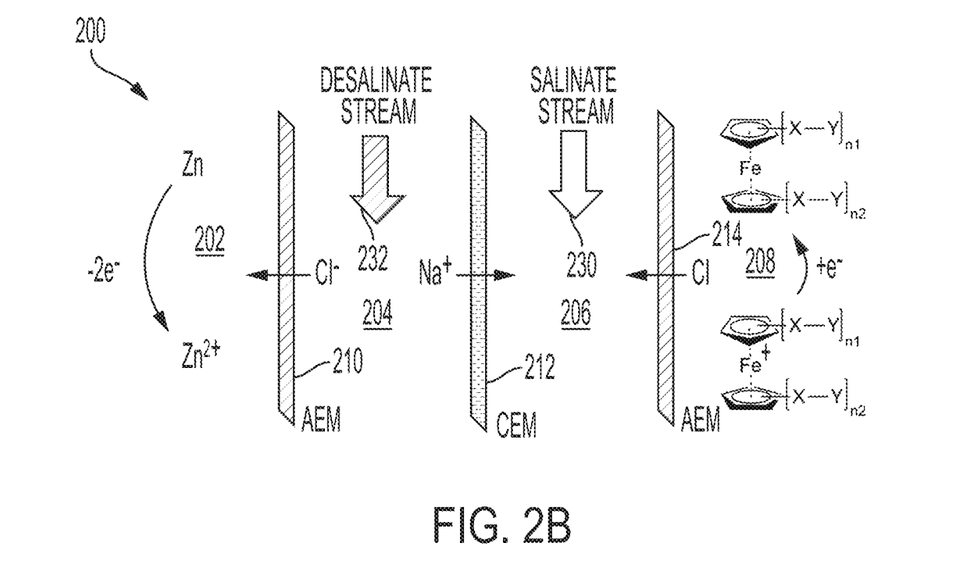
FIG. 2B is a schematic diagram of a discharge cycle of the electrodialytic battery of FIG. 2A in accordance with certain embodiments.

Embodiments of the four-chambered electrodialytic battery are shown in FIGS. 2A-2B. The desalination battery is a multi-chambered flow battery. Reduction of the anolyte and oxidation of the catholyte during a charge half-cycle moves $Na^+$ and $Cl^-$ ions through appropriate ion-selective membranes and into, or out of, intervening chambers that hold seawater. The reverse process takes place during the discharge half-cycle. At all points during cycling, one of the water chambers experiences a net influx of salt while the other sees a net efflux. The energy needed to affect the desalination is simply the difference in energy input during charging and the energy recovered during discharging.

In FIG. 2A, the charge cycle of a four-chambered battery using a positively charged pair of redox-active compounds is illustrated where one of the redox-active compounds is of Formula I and the other redox-active compound is zinc. The battery includes four chambers 202, 204, 206, and 208 as well as three membranes 210, 212, and 214. During the charge cycle, the salinate stream 230 is in chamber 204 between the anolyte chamber 202 and chamber 206, which contains the desalinate stream 232. The catholyte, containing the redox-active compound of Formula I, chamber 208 is separated from chamber 206 and the desalinate stream 232 by an anion exchange membrane 214 while the anolyte chamber 202 is separated from chamber 204 and the salinate stream 230 by another anion exchange membrane 210. As discussed above, membranes 210 and 214 may not necessarily comprise the same material or be of similar dimensions. The salinate chamber 204 is also separated from the desalinate chamber 206 by a cation exchange membrane 212. During the charge cycle, chloride and sodium ions cross membranes 210 and 212 to enter chamber 204 forming the salinate stream 230 while they cross membranes 214 and 212 to leave chamber 206 forming the desalinate stream 232.

FIG. 2B shows the same battery of FIG. 2A during a discharge cycle. Thus, chloride and sodium ions are shown crossing membranes 210 and 212 to leave chamber 204 forming the desalinate stream 232 while they cross membranes 214 and 212 to enter chamber 206 forming the salinate stream 230. Notably, if the reactants were negatively charged, the membranes would be reversed: membranes 210, 214 would be cation exchange membranes and membrane 212 would be an anion exchange membrane. As before, membranes 210 and 214 may not necessarily comprise the same material or be of similar dimensions when they are cation exchange membranes. In the embodiments shown, the anolyte is zinc and the catholyte is a redox-active compound of the Formula I. However, in other embodiments, the anolyte and catholyte may contain different redox-active compound of the Formula I.

In some embodiments, a redox-active compound that is previously available in the art may paired with a redox-active compound of Formula I. In some embodiments, the redox-active compound previously available in the art is a part of the anolyte and the redox-active compound of Formula I is a part of the catholyte. In some embodiments, the redox-active compound previously available in the art is a part of the catholyte and the redox-active compound of Formula I is a part of the anolyte.

The anolytes and catholytes of the previously available redox-active compounds are not restricted to the above-described embodiments. The previously available redox-active compound of the anolyte and/or catholyte may be an aqueous solution of any combination of the following, in one or more of their oxidation states, as their ions or oxocations or oxoanions and/or complexed to ligand(s): titanium(III), titanium(IV), vanadium(II), vanadium(III), vanadium(IV), vanadium(V), chromium(II), chromium(III), chromium(VI), manganese(II), manganese(III), manganese(VI), manganese (VII), iron(II), iron(III), iron (VI), cobalt(II), cobalt(III), nickel(II), copper(I), copper(II), zinc(II), ruthenium(II), ruthenium(III), tin(II), tin(IV), cerium(III), cerium(IV), tungsten(IV), tungsten(V), osmium(II), osmium(III), lead (II), zincate, aluminate, chlorine, chloride, bromine, bromide, tribromide, iodine, iodide, triiodide, polyhalide, halide oxyanion, sulfide, polysulfide, sulfur oxyanion, ferrocyanide, ferricyanide, a quinone derivative, an alloxazine derivative, a flavin derivative, a viologen derivative, a ferrocene derivative, any other metallocene derivative, a nitroxide radical derivative, a N,N-dialkyl-N-oxoammonium derivative, a nitronyl nitroxide radical derivative, and/or polymers incorporating complexed or covalently bound components of any of the aforementioned species.

The anolyte and catholyte may also include an aqueous solution of the components of a pH buffer that may or may not be redox-active under typical operating conditions. Thus, the redox-active compounds in the anolyte and catholyte should be stable at a wide range of pH values. The redox-active compounds of Formula I are stable and can function at a wide range of pH values.

In certain aqueous embodiments, the pH of the anolyte and catholyte is matched to the pH of the electrolyte in the central chambers, which may, for example, be near neutral (pH 5-9) for water desalination, acidic (pH 0-5) for treating acidic wastewater, or alkaline (pH 9-14) for treating alkaline wastewater. In some embodiments, it may be advantageous for the anolyte pH to be slightly lower than the other chambers such as when the anolyte is zinc/zinc chloride. In further embodiments, the pH of each of the electrolytes in the system is substantially the same within the electrochemical cell. In still further embodiments, the anolyte, catholyte, and water each has a pH between and including 3-10. Thus, the cell may include a pH monitoring and adjustment system for periodic and/or continuous pH monitoring and adjustment. In some embodiments the pH of the electrolyte is from 3-11. In some embodiments the pH of the electrolyte is from 5 to 9.

In further embodiments, an electrodialytic battery cell as described in FIGS. 2A-B may be coupled to an energy storage system when designed as a flow battery. Flow batteries are attractive for energy grid storage because they allow the energy storage capacity of the battery to be decoupled from the power that the battery may deliver. Aqueous flow batteries may be integrated into an electrochemical desalination system because they share many common desalination capital requirements such as pumps, plumbing, and cell stack designs, which may be exploited to perform both desalination and energy storage. In principle, incorporating electrical energy storage into a desalination battery would enable further reductions in cost by facilitating load shifting on the electrical grid, enabling electricity arbitrage, and/or enabling deferral of investments into transmission and distribution infrastructure. A desalination battery with a high cell potential would function as a viable energy storage device. By tapping the revenue streams that are available to an energy storage technology, the system may defray desalination costs while simultaneously enabling increased adoption of renewables.

The electrolytes (i.e., anolyte and catholyte) may be of varying compositions. In some embodiments the electrolyte composition includes a redox-active compound of the Formula I and an inorganic salt. In some embodiments, the redox-active compound of Formula I is present at a concentration of 2 wt-% up to 25-wt %. In some embodiments, the redox-active compound of Formula I is present at a concentration of 2 wt-% or greater, 3 wt-% or greater, 4 wt-% or greater, or 5 wt-% or greater. In some embodiments, the electrolyte composition may also include some amount of dissolved inorganic salt. In certain embodiments, the dissolved inorganic salt is the same material as in the liquid desiccant to be regenerated. In some embodiments, the inorganic salt is LiCl, LiBr, $CaCl_2$, $MgCl_2$, or any combination thereof. In some embodiments, the inorganic salt of the electrolyte composition is present at a concentration of 1 wt-% up to 60% wt-%. In some embodiments, the inorganic salt of the electrolyte composition is present at a concentration of 1 wt-% or greater, 5 wt-% or greater, or 10 wt-% or greater.

EXAMPLES

Example 1A

The following example describes a synthetic route to access the redox-active compounds of Formula I. Scheme 1 depicts a synthetic route to access the redox-active compounds of Formula I.

Scheme 1

First, an alkylation reaction is performed. In this reaction X is covalently bonded to a cyclopentadienyl ligand, producing an intermediate compound. It is understood that X may initially include a leaving group or a group that may be converted to a leaving group, such as a halogen (e.g., Cl) or another suitable group (e.g., hydroxyl). The leaving group is substituted by Y during Reaction 2. The alkylation reaction may be repeated to give the desired number of $n_1$ and $n_2$ substituents. In the alkylation reaction, the stoichiometry of ferrocene to X can be manipulated to better control $n_1$ and $n_2$ (described below).

Second, a reaction is performed where the intermediate compound is reacted with Y. In this reaction, Y is covalently bonded to X giving the redox-active compound of Formula I.

The first reaction and the second reaction may be done at elevated or reduced temperature to control reaction kinetics. The first reaction and the second reaction may be conducted in an organic solvent such as dichloromethane, acetonitrile, or tetrahydrofuran, or the like. The intermediate product of the alkylation reaction and the redox-active compound of Formula I may be isolated and purified via liquid chromatography or recrystallization. The intermediate product of the alkylation and the redox-active compound product of Formula I products of the alkylation and reduction reactions may be characterized by NMR, IR, mass spectrometry, or other characterization techniques.

Example 1B

The following example describes a synthetic route to access the redox-active compound tetrakis((3-trimethylammonio)propyl)ferrocene tetrachloride (TTMAP-Fc). The method described in this example may be used to synthesize other redox-active compounds of the general Formula I.

Scheme II depicts a synthetic route to access the redox-active compound TTMAP-Fc. TTMAP-Fc is described in terms of Formula I where $n_1$ and $n_2$ are each 2, each X is propyl, each Y is trimethylammonio, and 4 Cl⁻ counterions. Other counterions may also be used.

Scheme II

Synthesis of TTMAP-Fc may be done in 3 steps. The first step is acylation of the cyclopentadienyl ligands giving an acyl intermediate. The acylation reaction may be done by mixing 1 molar equivalent of ferrocene, 2 molar equivalents of 3-chloropropionyl chloride, and a stoichiometric amount of aluminum trichloride ($AlCl_3$) in a reaction vessel.

The second step is the in situ reduction of the acylated intermediate formed from the acylation reaction to the corresponding alkane giving an alkane intermediate. Reduction of the acyl functionality may be accomplished by mixing the reaction mixture from the previous reaction containing the acyl intermediate (without workup or isolation) and sodium borohydride in a reaction vessel. Alternatively, lithium borohydride may be used to reduce the acyl functionality.

For better control of $n_1$ and $n_2$ substituents, the acylation and reduction reactions may be done in a repetitious manner varying the stoichiometry of the ferrocene (or ketone intermediate) and 3-chloropropionyl chloride. For example, to synthesize TTMAP-Fc using this method, the alkylation reaction and reduction reaction are repeated two times where the stoichiometry of the first alkylation reaction is 1:2 ferrocene to 3-chloropropionyl chloride and the stoichiometry of the second alkylation reaction is 1:2 ferrocene to 3-chloropropionyl chloride.

To synthesize compounds of the general Formula I where $n_1$ and $n_2$ are greater than 2, the alkylation reaction and reduction reaction may be repeated the appropriate number of times with the appropriate stoichiometric ratios of ferrocene (or the ferrocene product from the first alkylation and reduction steps) and 3-chloropropionyl chloride. For example, if the desired compound had $n_1$ of 3 and an $n_2$ of 3 then the alkylation and reduction reactions steps would be done a total of three times where each of the alkylation reactions the ratio of ferrocene to 3-chloropropionyl chloride is 1:2. For example, if the desired compound had $n_1$ of 2 and an $n_2$ of 1 then the alkylation and reduction steps would be performed two times where the stoichiometry of the first alkylation reaction would be 1:2 ferrocene: 3-chloropropionyl chloride and the stoichiometry of the second alkylation reaction would be 1:1 ferrocene: 3-chloropropionyl chloride.

Each of the alkylation and reduction reactions may be done at elevated or reduced temperature to control reaction kinetics. Each of the alkylation and reduction reactions may be conducted in an organic solvent such as dichloromethane, acetonitrile, or tetrahydrofuran, or the like. The products of each of the alkylation and reduction reactions can be isolated and purified via liquid chromatography or recrystallization. The products of the alkylation and reduction reactions may be characterized by NMR, IR, or mass spectrometry.

The third step to synthesize TTMAP-Fc is quaternization of alkane intermediate. To this end, the alkane intermediate is mixed with excess trimethylamine and ethanol in a sealed reaction vessel and heated to 60-80° C.

The product of the quaternization step may be isolated and purified via liquid chromatography or recrystallization. The product of the amination step may by NMR, IR, or mass spectrometry.

Example 2

Figure 5:
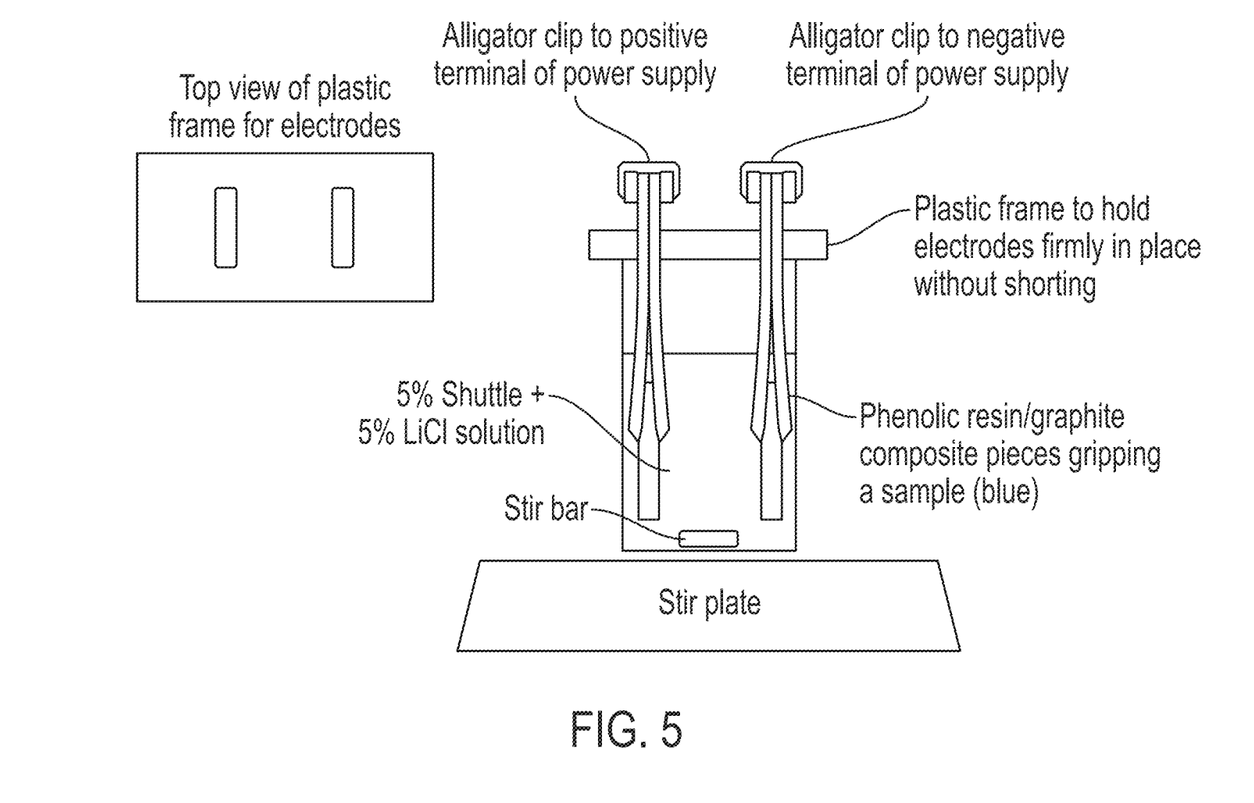
FIG. 5 is an example experimental setup for testing the stability of redox-active compounds.

The decomposition of TTMAP-Fc, or any other redox-active compound of the general Formula I, can be tested using by exposing TTMAP-Fc to a continuous voltage supply and monitoring decomposition and polymerization of the cyclopentadienyl ligands via mass spectrometry. FIG. 5 shows an example experimental setup. In this setup 5-wt % of the redox-active compound (TTMAP-Fc) is mixed in a solution of 5-wt % lithium chloride. The solution is exposed to a continuous voltage. At various time points aliquots of the solution may be taken and examined via mass spectrometry. To test the stability of redox-active compounds in different environments the experiment may be conducted at various salt concentrations, various redox-active compound concentrations, at various pH levels, and with a variety of different salts.

Example 3

An energy-efficient redox-assisted electrodialysis system may be constructed consistent with that shown in FIG. 1B wherein a redox-active compound of the general Formula I is used in place of Fe(CN) as the redox-active compound. The use of the redox-active compounds of the general Formula I is expected to avoid the formation of insoluble solids that will be formed from the reaction of Fe(CN) with certain metal ions. The anode and cathode may be constructed of three sheets of porous carbon fiber paper (SGL 39AA available from SGL Carbon in Wiesbaden, Germany) pressed onto pyrosealed graphite blocks with serpentine flow channels (available from Entegris in Billerica, Mass.) and separated from the central desalinate/salinate chambers by VITON© gaskets (available from Atlantic Gasket Corporation in Philadelphia, Pa.). The anion exchange membranes may be FUMASEP FAS-30 (available from The Fuel Cell Store in College Station, Tex.) and the cation exchange membrane may be FUMASEP E630 (available directly from FuMATech).

In an exemplary operation mode, a solution of 0.05 M of TTMAP-Fc, 0.05 M TTMAP-Fc, and 1% NaCl (50 mL) can be flown past the anode/cathode and 0.6 M NaCl can be in both the salinate and desalinate chambers (50 mL each) and the high-frequency ASR of the system measured. Current density is directly proportional to the salt transport rate. Depending on how the cell is operated, the specific energy consumption is lower than that of conventional electrodialysis at current densities below about 40 mA/cm$^2$, and lower than that of reverse osmosis below about 10 mA/cm$^2$, though the specific energy consumption for reverse osmosis will rise sharply with increased intake salinity. If necessary, the cell can produce larger volumes of desalinate at a higher specific energy consumption. Improvements to the specific energy consumption of the cell are expected as a result of lowered ASR. With this system, direct production of water at a drinkable salinity (<0.5 ppt NaCl) is possible in a single stage from seawater (e.g., 35 ppt NaCl). A constant voltage of 0.5 V may be applied to the cell, causing the water in the salinate chamber to increase in salt concentration and the water in the desalinate chamber to decrease in salt concentration.

In another possible electrodialysis system, several stages of desalination can be performed, in which the redox-active compound, optionally with a supporting electrolyte comprising the salt in the salinate/desalinate, is employed at an appropriate concentration relative to the salt concentration in the salinate/desalinate in order to minimize water transport in each stage. This reduces or minimizes energy inefficiencies arising from water transport from the salinate/desalinate chambers to or from the anolyte/catholyte chambers.

The invention claimed is:

1. A redox-active compound comprising:
    a ferrocene core comprising two cyclopentadienyl ligands,
    one or more substituents bonded to each of the cyclopentadienyl ligands, independently selected from —X—Y, where X is $C_1$ to $C_{12}$ straight or branched alkyl, and Y is a solubilizing group comprising one or more of oligo(ethyleneglycol), hydroxyl, trialkylammonio, alkylimidazolio, sulfonate, sulfate, carboxyl, phosphate, phosphonate, ammonium, or a nitrogen containing heterocycle, wherein a total number of substituents bonded to cyclopentadienyl ligands per ferrocene core is three or greater.

2. The redox-active compound of claim 1, wherein the solubilizing group is trialkylammonio or alkylimidazolio comprising alkyl substituents, and wherein the alkyl substituents on the solubilizing group are independently $C_1$ to $C_{12}$ alkyl.

3. The redox-active compound of claim 1, wherein Y is trialkylammonio and at least one of the alkyls is methyl.

4. The redox-active compound of claim 1, wherein a total number of substituents bonded to the cyclopentadienyl ligands is four or greater per ferrocene core.

5. The redox-active compound of claim 1, wherein X is $C_2$ to $C_6$.

6. The redox-active compound of claim 1, further comprising one or more counterions.

7. A redox-active composition comprising the redox-active compound of claim 1.

8. An electrolyte composition comprising an aqueous solution of:
    the redox-active compound of claim 1; and
    salt.

9. The electrolyte composition of claim 8, wherein the redox-active compound is present at a concentration of 2 wt-% or greater.

10. The electrolyte composition of claim 8, wherein the redox-active compound is present at a concentration of up to 25 wt-%.

11. The electrolyte composition of claim 8, wherein the salt comprises LiCl, LiBr, $CaCl_2$, $MgCl_2$, or a combination thereof.

12. The electrolyte composition of claim 8, wherein the salt is present at a concentration of 1 wt-% or greater.

13. The electrolyte composition of claim 8, wherein the salt is present at a concentration of up to 60 wt-%.

14. The electrolyte composition of claim 8, wherein the aqueous solution has a pH of 3 to 11.

15. A system comprising:
an apparatus comprising:
   a first reservoir comprising a first input and a first output;
   a second reservoir comprising a second input and a second output;
   a first electrolyte chamber comprising a first electrode;
   a second electrolyte chamber comprising a second electrode;
   a first type of membrane disposed between the first and second reservoirs, wherein the first and second reservoirs are in electrolytic communication with each other via the first type of membrane; and
   a second type of membrane, different from the first type, disposed between the first electrolyte chamber and the first reservoir, wherein the first electrolyte chamber and the first reservoir are in electrolytic communication with each other via the second type of membrane, and disposed between the second electrolyte chamber and the second reservoir, wherein the second electrolyte chamber and the second reservoir are in electrolytic communication with each other via the second type of membrane;
a first solution disposed within the first electrolyte chamber; and
a second solution disposed within second electrolyte chamber;
one or both of the first and second solutions comprising the redox-active compound of claim 1.

16. The system of claim 15, wherein the solubilizing group is trialkylammonio or alkylimidazolio comprising alkyl substituents, and wherein the alkyl substituents on the solubilizing group are independently $C_1$ to $C_{12}$ alkyl.

17. The system of claim 15, wherein Y is trialkylammonio and at least one of the alkyls is methyl.

18. The system of claim 15, wherein a total number of substituents bonded to the cyclopentadienyl ligands is four or greater per ferrocene core.

19. The system of claim 15, wherein X is $C_2$ to $C_6$.

* * * * *